United States Patent
Sakata et al.

(10) Patent No.: US 7,277,818 B2
(45) Date of Patent: Oct. 2, 2007

(54) METHOD AND PROGRAM FOR LEVELING ASPHERICAL WORKPIECES

(75) Inventors: Yukihiro Sakata, Kawasaki (JP); Fumihiro Takemura, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 47 days.

(21) Appl. No.: 11/368,753

(22) Filed: Mar. 6, 2006

(65) Prior Publication Data

US 2006/0196063 A1    Sep. 7, 2006

(30) Foreign Application Priority Data

Mar. 7, 2005    (JP)    ............... 2005-062700

(51) Int. Cl.
  G01C 9/00    (2006.01)
  G01B 5/00    (2006.01)

(52) U.S. Cl. .................................... 702/154

(58) Field of Classification Search ............ 702/154
  See application file for complete search history.

(56) References Cited

U.S. PATENT DOCUMENTS 5,253,429 A * 10/1993 Konno et al. .............. 33/568
6,745,616 B1 * 6/2004 Katayama et al. ........... 73/104

FOREIGN PATENT DOCUMENTS

JP    11-211426    8/1999
JP    2000-266534    9/2000

* cited by examiner

*Primary Examiner*—Michael P. Nghiem
*Assistant Examiner*—Cindy D. Khuu
(74) *Attorney, Agent, or Firm*—Rankin, Hill, Porter & Clark LLP

(57) ABSTRACT

The invention provides an aspherical workpiece leveling method for leveling an aspherical workpiece mounted on a tilt correction table. The method includes three-dimensionally measuring a surface of the aspherical workpiece containing an extreme value; deriving a secondary curved surface from the obtained three-dimensionally measured values to obtain an extreme value of the secondary curved surface as a temporary extreme value; obtaining three-dimensionally measured values at three or more points from the surround about the obtained temporary extreme value; obtaining a plane defined by the obtained three-dimensionally measured values at three or more points; and adjusting the tilt correction table for leveling the obtained plane.

11 Claims, 6 Drawing Sheets

METHOD AND PROGRAM FOR LEVELING ASPHERICAL WORKPIECES

CROSS REFERENCE TO RELATED APPLICATION

This application is based on and claims the benefit of prior Japanese Patent Application No. 2005-062700, filed on Mar. 7, 2005, the entire contents of which are incorporated herein by reference.

BACKGROUND OF THE INVENTION

1. Field of the Invention

The present invention relates to an aspherical workpiece leveling method and program applicable to a contour measuring machine including a tilt correction table and the like.

2. Description of the Related Art

Generally, surface form measuring machines have been provided for measuring aspherical forms such as aspherical lenses. One of such the surface form measuring machines comprises an optical measuring probe, and a first rotating means and a second rotating means forming a certain angle therebetween. These rotating means are used to rotate the optical measuring probe to match the optical axis of the measuring probe with all directions of the normal to a target surface to be measured. This makes it possible to accurately measure the surface form of even a complicated aspherical form, as known (JP-A 11-211426, Document 1).

A surface texture measuring machine may comprise a stylus for scanning a target surface to measure the surface texture of the target surface. This machine comprises a tilt adjuster provided on a measuring table for centering a cylindrical form and a conical form, as known (JP-A 2000-266534, Document 2a; U.S. Pat. No. 6,745,616, Document 2b).

The machine disclosed in the above-described Document 1, however, requires rotations of the measuring probe about two axes having a certain angle, and accordingly causes a problem associated with the large scale of the machine. Documents 2 failed to disclose an appropriate method of leveling an aspherical workpiece with unknown design values. The machine disclosed in Documents 2 is capable of measuring the table with the workpiece mounted thereon for leveling while leaving the positional relation between the workpiece and the table unknown. In other words, it can not exclude the influence due to the workpiece attachment error always.

SUMMARY OF THE INVENTION

In one aspect the present invention provides an aspherical workpiece leveling method of leveling an aspherical workpiece mounted on a tilt correction table. The method comprises three-dimensionally measuring a surface of the aspherical workpiece containing an extreme value; deriving a secondary curved surface from the obtained three-dimensionally measured values to obtain an extreme value of the secondary curved surface as a temporary extreme value; obtaining three-dimensionally measured values at three or more points from the surround about the obtained temporary extreme value; obtaining a plane defined by the obtained three-dimensionally measured values at three or more points; and adjusting the tilt correction table for leveling the obtained plane.

In another aspect the present invention provides an aspherical workpiece leveling method of leveling an aspherical workpiece mounted on a tilt correction table. The method comprises three-dimensionally measuring a surface of the aspherical workpiece containing an extreme value; deriving a secondary curved surface from the obtained three-dimensionally measured values to obtain an extreme value of the secondary curved surface as a temporary extreme value; obtaining three-dimensionally measured values at three or more points from the surround about the obtained temporary extreme value; obtaining a plane defined by the obtained three-dimensionally measured values at three or more points; determining whether the obtained plane and the horizontal plane have an error falling within a certain range and terminating the process if the error falls within the certain range; and adjusting the tilt correction table for leveling the obtained plane if the error falls outside the certain range, prior to the return to the step of three-dimensionally measuring the aspherical workpiece, wherein the above steps are repeated until the error falls within the certain range.

In one aspect the present invention provides a computer-executable aspherical workpiece leveling program for leveling an aspherical workpiece mounted on a tilt correction table. The program comprises three-dimensionally measuring a surface of the aspherical workpiece containing an extreme value; deriving a secondary curved surface from the obtained three-dimensionally measured values to obtain an extreme value of the secondary curved surface as a temporary extreme value; obtaining three-dimensionally measured values at three or more points from the surround about the obtained temporary extreme value; obtaining a plane defined by the obtained three-dimensionally measured values at three or more points; and adjusting the tilt correction table for leveling the obtained plane.

DETAILED DESCRIPTION OF THE INVENTION

The present invention will now be described with reference to the drawings.

Figure 1:
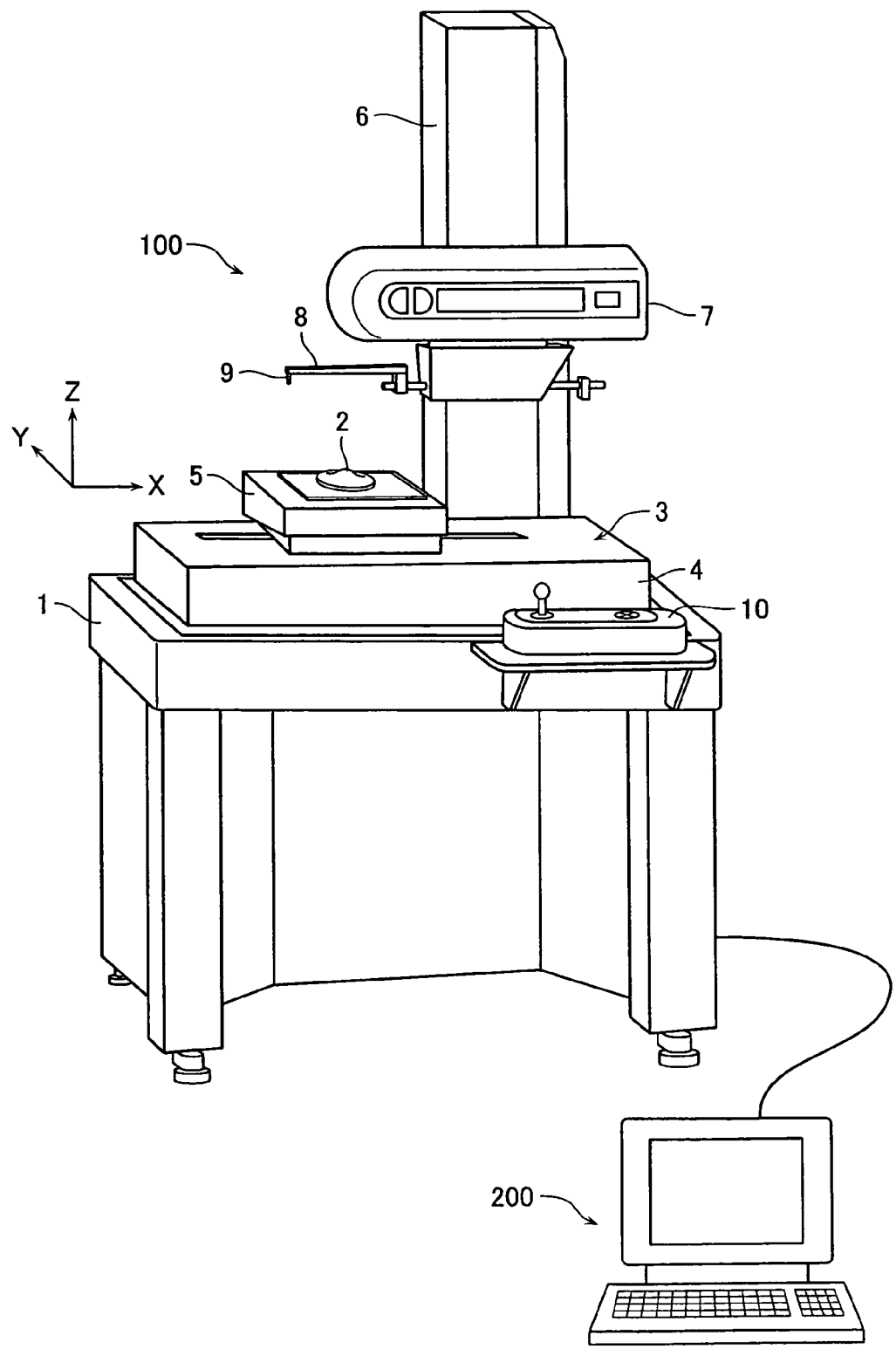
FIG. 1 is an external perspective view showing an arrangement of a contour measuring machine according to an embodiment of this invention.

FIG. 1 is an external perspective view of a form measuring machine 100 according to an embodiment of this invention. The form measuring machine is a contour measuring machine in this example. Alternatively, it may be another form measuring machine such as a three-dimensional measuring machine and a non-contact image measuring machine.

The major part of the machine 100 is mounted on a table 1, on which a workpiece mount table 3 is provided to receive a workpiece 2 mounted thereon. The workpiece mount table 3 includes a base plate 4, and a movable table 5 that moves in the X-direction (lateral direction) in the figure over the base plate 4 and shifts the workpiece 2 in the Y-direction (direction orthogonal to the page) in FIG. 1. The movable table 5 also serves as a tilt adjustment-functioned table capable of adjusting the mounted surface of the workpiece 2 in any attitude. The table 1 is fixedly provided with a column 6 that extends in the vertical direction. The column 6 is equipped with a slider 7 that is movable in the vertical direction. The slider 7 is equipped with a stylus arm 8. The stylus arm 8 is driven in the horizontal (X) direction on operation from a console 10 to trace a surface of the workpiece 2 with a stylus 9 provided at the tip of the stylus arm. As a result, a height, Z, of the surface at each position in the X-direction can be obtained as measured data. When the movable table 5 moves the workpiece 2 in the Y-direction, scan lines extending in the X-direction can be switched among them.

Figure 2:
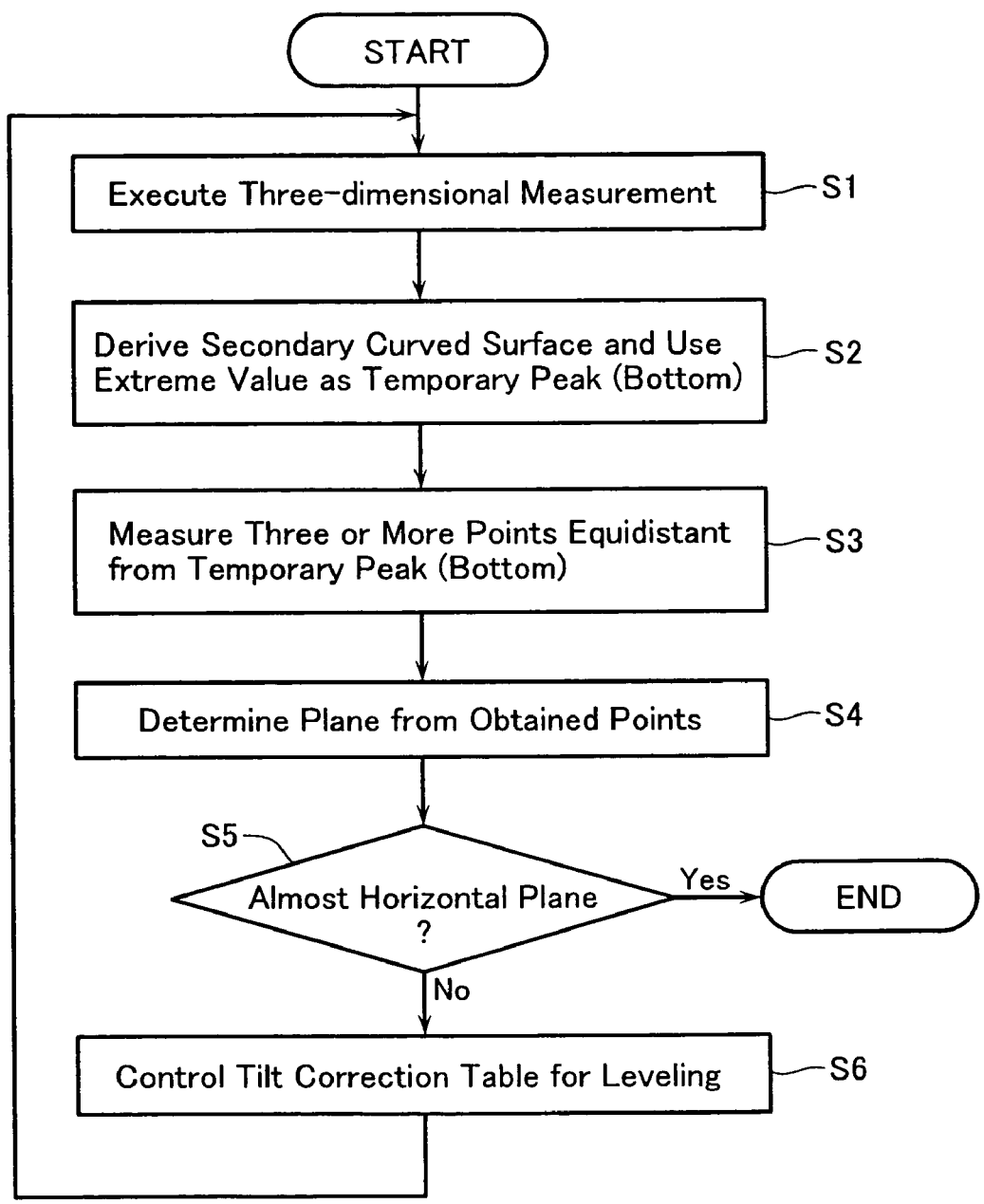
FIG. 2 is a flowchart showing a process of leveling an aspherical workpiece, which is executed in the measuring machine.

The measured data is fed into a computer 200 and subjected to form analysis. If the workpiece 2 is an aspherical workpiece, a process of leveling the aspherical workpiece is executed prior to the form analysis. The computer 200 runs a certain aspherical workpiece leveling program to execute the process as shown in FIG. 2.

Figure 3:
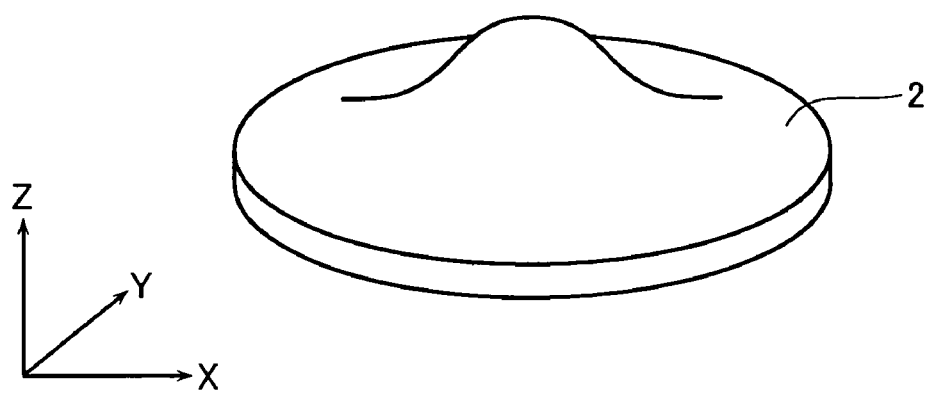
FIG. 3 is a perspective view showing an aspherical workpiece to be leveled.
Figure 4:
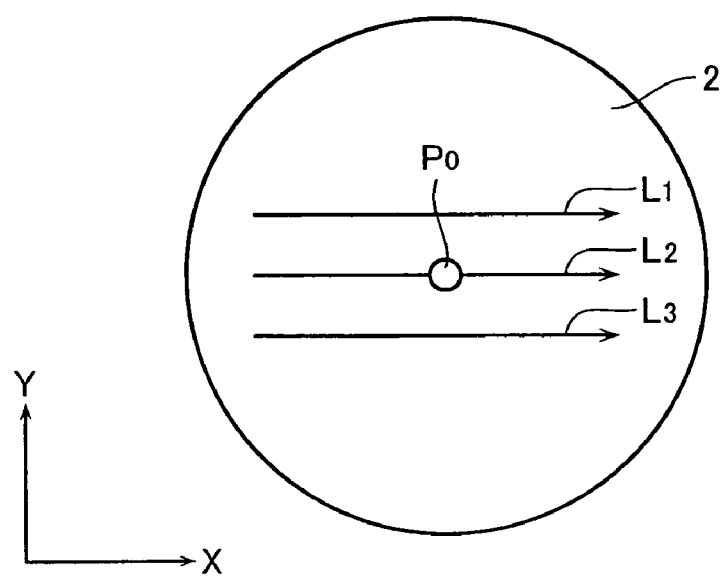
FIG. 4 is a plan view of a workpiece illustrative of the contents of the process of leveling.

First, a three-dimensional measurement is executed (S1). The aspherical workpiece to be measured in this embodiment is such the workpiece 2 that has a uniform tilt at positions equidistant from the peak, for example, as shown in FIG. 3. In the case of the contour measuring machine, the surface of such the aspherical workpiece 2 is scanned along a plurality of scan lines L1, L2, L3 and so on located at a certain distance from each other in the Y-direction as shown in FIG. 4. As a result, the height of each point in the Z-direction is sampled and acquired as three-dimensionally measured data.

Next, a secondary curved surface is derived from the acquired three-dimensionally measured data, and an extreme value of this secondary curved surface is obtained as a temporary peak point (or bottom point) P0 as shown in FIG. 4 (S2). In this stage, as the workpiece 2 has not yet been leveled, P0 is a temporary peak value to the last.

Figure 5:
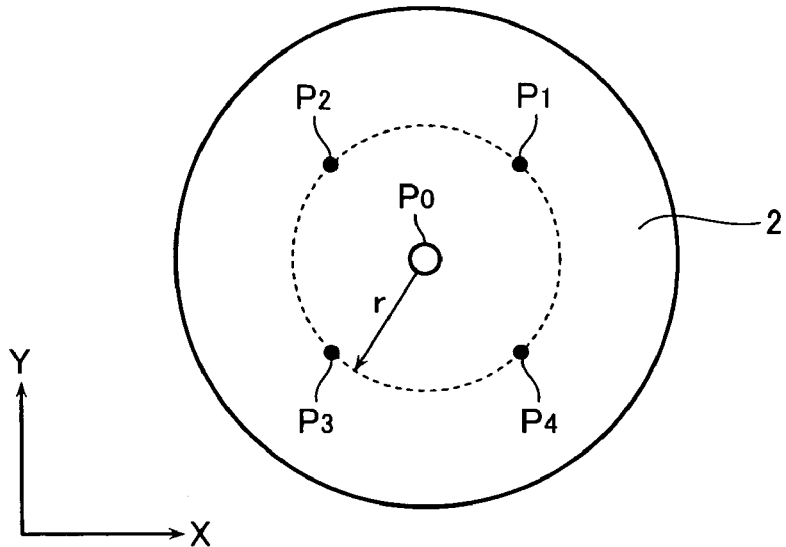
FIG. 5 is a plan view of a workpiece illustrative of the contents of the process of leveling.
Figure 6:
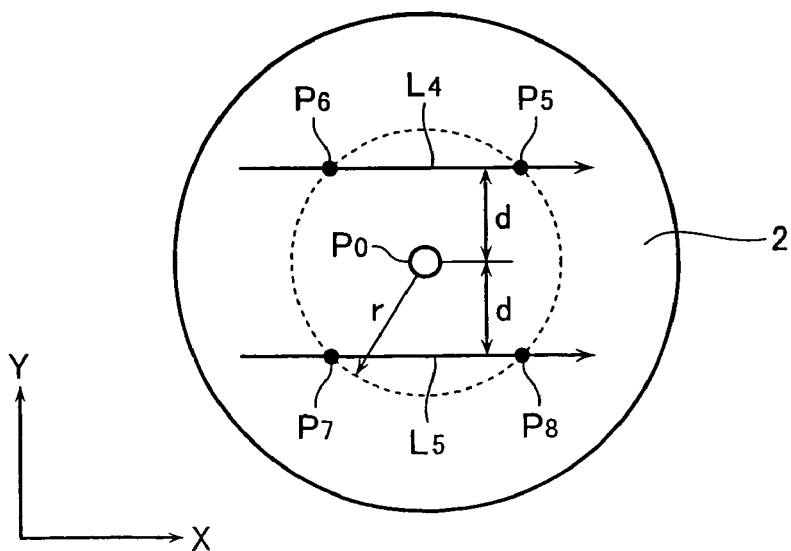
FIG. 6 is a plan view of a workpiece illustrative of the contents of the process of leveling.

Subsequently, three or more points are measured on a circumference of radius, r, about the temporary peak point P0 as shown in FIG. 5 (S3). In this example, four points P1, P2, P3, P4 are measured. Desirably, the four points are selected as uniform as possible. The measured points P1-P4 are measured on a point-by-point basis while moving the stylus 9. Such the measurement of the measured points on a point-by-point basis may be replaced as shown in FIG. 6. In this case, mutually parallel scan lines L4, L5 are set through positions, which sandwich the temporary peak point P0 therebetween and are at a distance, d, from the peak point P0 in the Y-direction, respectively. These scan lines L4, L5 and the circle of radius r have cross points P5, P6, P7, P8 therebetween, which may be obtained as the measured points.

Figure 7:
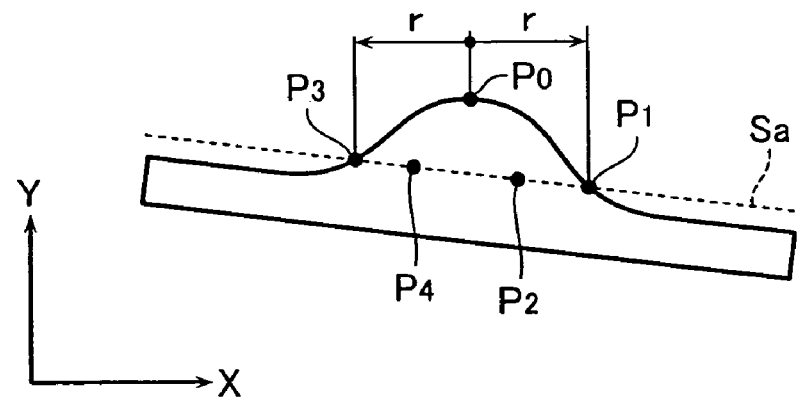
FIG. 7 is a side view of a workpiece illustrative of the contents of the process of leveling.
Figure 8:
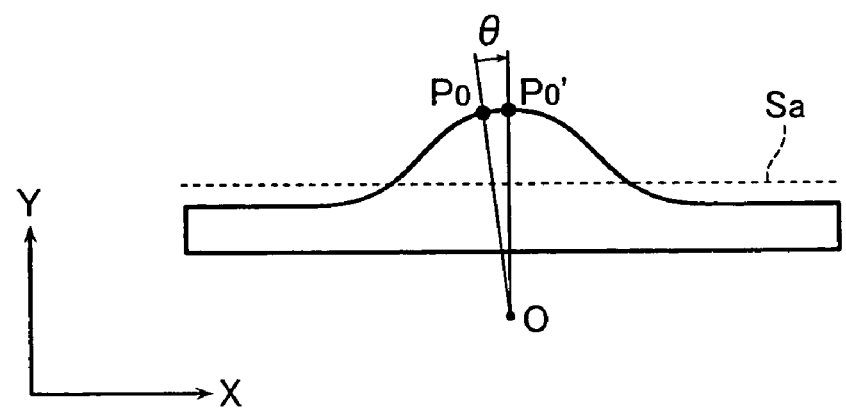
FIG. 8 is a side view of a workpiece illustrative of the contents of the process of leveling.

Next, as shown in FIG. 7, a plane Sa is determined from the obtained three or more measured points (S4). In the case of three measured points, the plane Sa can be determined in a single way. In the case of four or more measured points, however, the plane may be determined as a least-square plane. The obtained plane Sa is determined if it can be regarded as an almost horizontal plane in accordance with whether an error between the direction of the normal and the direction of the standard axis (Z-axis) falls within a certain range (for example, ±1°) (S5). If the obtained plane Sa can be regarded as an almost horizontal plane, the temporary peak value P0 is employed as a true peak value P0', and the control goes to the curved surface analysis. To the contrary, if it can not be regarded as an almost horizontal plane, the tilt correction-functioned movable table 5 is subjected to tilt correction to tilt-correct the workpiece 2 such that the plane Sa becomes an almost horizontal plane as shown in FIG. 8 (S6). As a result, the peak value also transfers from P0 to P0'. So the process is repeated again from the step Si. This process is repeated until the plane can be regarded as an almost horizontal plane in the step S5 to finish the process of leveling the aspherical workpiece 2.

Figure 9:
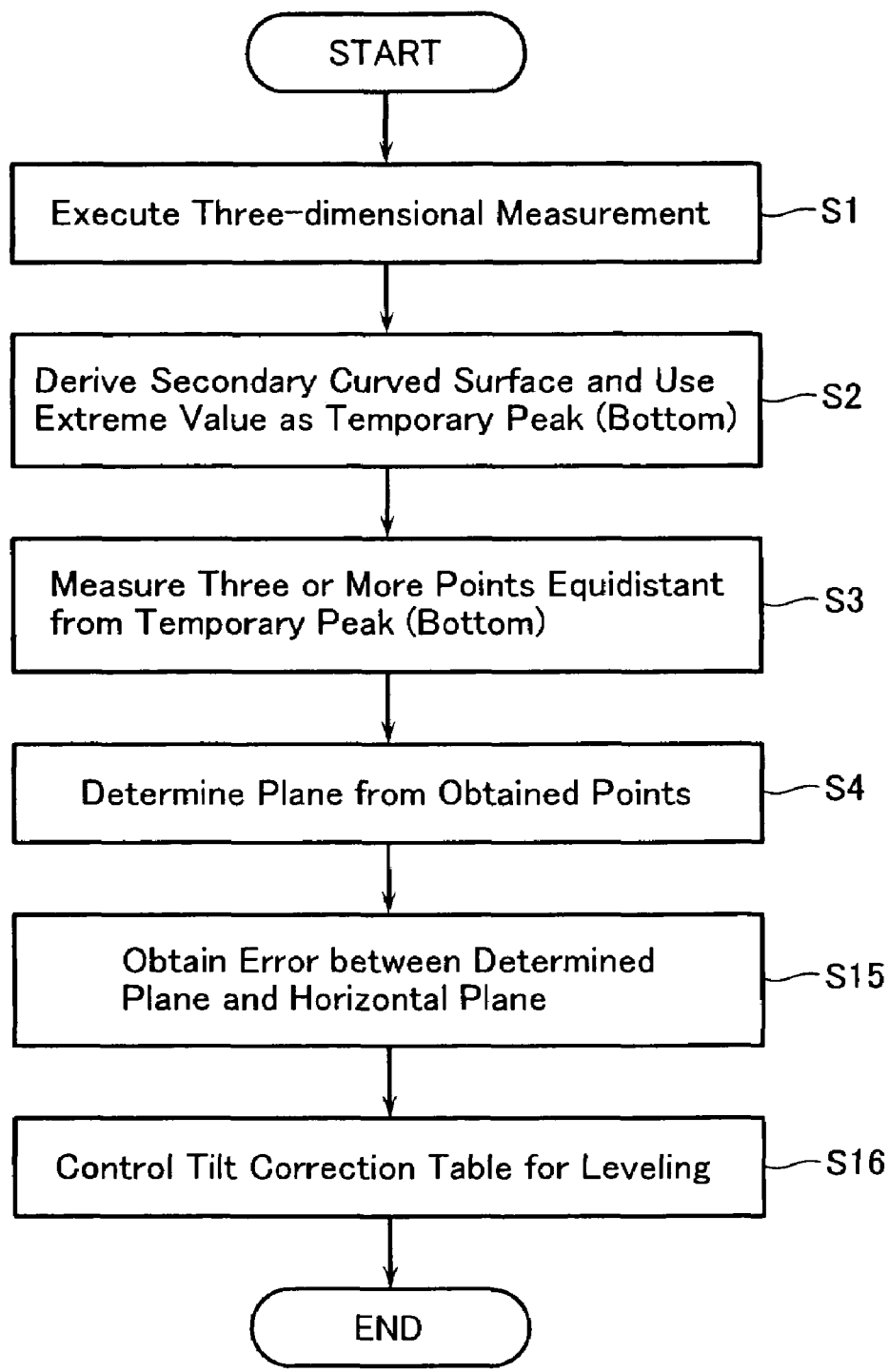
FIG. 9 is a flowchart showing a process of leveling an aspherical workpiece according to another embodiment of the present invention.

FIG. 9 is a flowchart showing a process of leveling an aspherical workpiece according to another embodiment of the present invention.

In this embodiment, after the plane is determined in the step S4, an error between the plane and the horizontal plane is obtained (S15). Then, the tilt correction table is controlled by the obtained error for leveling (S16). This makes it possible to level the aspherical workpiece in a shorter period of time than the preceding embodiment.

In the above examples, leveling is performed based on the peak value of the workpiece. Alternatively, another extreme value of the workpiece, or a bottom value, may be employed for leveling.

What is claimed is:

1. An aspherical workpiece leveling method of leveling an aspherical workpiece mounted on a tilt correction table, comprising:

three-dimensionally measuring a surface of the aspherical workpiece containing an extreme value;

deriving a curved surface from the obtained three-dimensionally measured values to obtain an extreme value of the curved surface as a temporary extreme value;

obtaining three-dimensionally measured values at three or more points from the surround about the obtained temporary extreme value;

obtaining a plane defined by the obtained three-dimensionally measured values at three or more points; and adjusting the tilt correction table for leveling the obtained plane.

2. The aspherical workpiece leveling method according to claim 1, wherein the step of obtaining three-dimensionally measured values at three or more points includes obtaining three-dimensionally measured values at points equidistant from the obtained temporary extreme value.

3. The aspherical workpiece leveling method according to claim 1, wherein the step of obtaining three-dimensionally measured values at three or more points includes locating the obtained temporary extreme value inward, and obtaining three-dimensionally measured values at points on mutually parallel scan lines equidistant from the temporary extreme value.

4. The aspherical workpiece leveling method according to claim 1, wherein the aspherical workpiece has a uniform tilt at positions equidistant from the peak.

5. The aspherical workpiece leveling method according to claim 1, further comprising the steps of:

before adjusting the tilt correction table for leveling the obtained plane, determining whether the obtained plane is horizontal; and if the obtained plane is almost horizontal, the process terminates, if the obtained plane is not almost horizontal, proceeding to the step of adjusting the tilt correction table for leveling the obtained plane.

6. An aspherical workpiece leveling method of leveling an aspherical workpiece mounted on a tilt correction table, comprising:

three-dimensionally measuring a surface of the aspherical workpiece containing an extreme value;

deriving a curved surface from the obtained three-dimensionally measured values to obtain an extreme value of the curved surface as a temporary extreme value obtaining three-dimensionally measured values at three or more points from the surround about the obtained temporary extreme value;

obtaining a plane defined by the obtained three-dimensionally measured values at three or more points;

determining whether the obtained plane and the horizontal plane have an error falling within a certain range and terminating the process if the error falls within the certain range; and adjusting the tilt correction table for leveling the obtained plane if the error falls outside the certain range, prior to the return to the step of three-dimensionally measuring the aspherical workpiece, wherein the above steps are repeated until the error falls within the certain range.

7. The aspherical workpiece leveling method according to claim 6, wherein the step of obtaining three-dimensionally measured values at three or more points includes obtaining three-dimensionally measured values at points equidistant from the obtained temporary extreme value.

8. The aspherical workpiece leveling method according to claim 6, wherein the step of obtaining three-dimensionally measured values at three or more points includes locating the obtained temporary extreme value inward, and obtaining three-dimensionally measured values at points on mutually parallel scan lines equidistant from the temporary extreme value.

9. The aspherical workpiece leveling method according to claim 6, wherein the aspherical workpiece has a uniform tilt at positions equidistant from the peak.

10. A computer-executable aspherical workpiece leveling program stored in a computer-readable medium for leveling an aspherical workpiece mounted on a tilt correction table, comprising:

three-dimensionally measuring a surface of the aspherical workpiece containing an extreme value;

deriving a curved surface from the obtained three-dimensionally measured values to obtain an extreme value of the curved surface as a temporary extreme value obtaining three-dimensionally measured values at three or more points from the surround about the obtained temporary extreme value;

obtaining a plane defined by the obtained three-dimensionally measured values at three or more points; and adjusting the tilt correction table for leveling the obtained plane.

11. The computer-executable aspherical workpiece leveling program according to claim 10, further comprising:

before adjusting the tilt correction table for leveling the obtained plane, determining whether the obtained plane is horizontal; and if the obtained plane is almost horizontal, the process terminates, if the obtained plane is not almost horizontal, proceeding to the step of adjusting the tilt correction table for leveling the obtained plane.

* * * * *